(12) United States Patent
I

(10) Patent No.: US 10,060,449 B2
(45) Date of Patent: Aug. 28, 2018

(54) METHOD FOR ATTACHING/REMOVING VANE RING AND AUXILIARY SUPPORT DEVICE FOR VANE SEGMENT USED IN SAID METHOD

(71) Applicant: MITSUBISHI HITACHI POWER SYSTEMS, LTD., Kanagawa (JP)

(72) Inventor: Yoshiyuki I, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 421 days.

(21) Appl. No.: 14/759,776

(22) PCT Filed: Oct. 23, 2013

(86) PCT No.: PCT/JP2013/078696
§ 371 (c)(1),
(2) Date: Jul. 8, 2015

(87) PCT Pub. No.: WO2014/141521
PCT Pub. Date: Sep. 18, 2014

(65) Prior Publication Data
US 2015/0354597 A1 Dec. 10, 2015

(30) Foreign Application Priority Data

Mar. 14, 2013 (JP) .................................. 2013-051664

(51) Int. Cl.
*F04D 29/64* (2006.01)
*F04D 19/00* (2006.01)
(Continued)

(52) U.S. Cl.
CPC ......... *F04D 29/644* (2013.01); *F01D 25/246* (2013.01); *F01D 25/285* (2013.01);
(Continued)

(58) Field of Classification Search
CPC ...... F04D 29/644; F04D 29/541; F04D 19/00; F01D 25/246; F01D 25/285
See application file for complete search history.

(56) References Cited

U.S. PATENT DOCUMENTS

2012/0233837 A1 9/2012 Bartlam et al.

FOREIGN PATENT DOCUMENTS

CN 1894485 1/2007
CZ 2011-181 8/2011
(Continued)

OTHER PUBLICATIONS

The First Office Action dated Dec. 16, 2016 in corresponding Chinese Application No. 201610217321.6 (with English translation).
(Continued)

*Primary Examiner* — Moshe Wilensky
(74) *Attorney, Agent, or Firm* — Wenderoth, Lind & Ponack, L.L.P.

(57) ABSTRACT

A method includes a casing disposing step for disposing a top casing, with a split surface of the top casing facing downward, at a workable position where a space is secured such that it is possible to dispose a vane segment attached to the top casing below the top casing. Next, a segment moving step is executed for moving the vane segment attached to the top casing in a circumferential direction and disposing the vane segment in the space below the top casing.

6 Claims, 17 Drawing Sheets

(51) Int. Cl.
F04D 29/54 (2006.01)
F01D 25/24 (2006.01)
F01D 25/28 (2006.01)

(52) U.S. Cl.
CPC ........... *F04D 19/00* (2013.01); *F04D 29/541* (2013.01); *Y02T 50/671* (2013.01); *Y10T 29/4932* (2015.01); *Y10T 29/49329* (2015.01)

(56) References Cited

FOREIGN PATENT DOCUMENTS

| | | |
|---|---|---|
| JP | 4-109820 | 9/1992 |
| JP | 10-317912 | 12/1998 |
| JP | 2002-371805 | 12/2002 |
| JP | 2006-257966 | 9/2006 |
| JP | 2007-120321 | 5/2007 |
| WO | 2008/012195 | 1/2008 |

OTHER PUBLICATIONS

Notice of Reasons for Rejection dated Oct. 4, 2016 in corresponding Japanese Application No. 2013-051664 (with English translation).
International Search Report dated Nov. 26, 2013 in corresponding International Application No. PCT/JP2013/078696, with English translation.
Written Opinion of the International Searching Authority dated Nov. 26, 2013 in corresponding International Application No. PCT/JP2013/078696, with English translation.
First Office Action dated Dec. 3, 2015 in Chinese Application No. 201380069666.6 (with English translation).

METHOD FOR ATTACHING/REMOVING VANE RING AND AUXILIARY SUPPORT DEVICE FOR VANE SEGMENT USED IN SAID METHOD

CROSS-REFERENCE TO RELATED APPLICATION

The present application claims priority based on Japanese Unexamined Patent Application Publication No. 2013-051664 filed on Mar. 14, 2013, the contents of which are incorporated herein.

TECHNICAL FIELD

The present invention relates to a method for attaching/removing a vane ring formed in an annular shape and able to split in the circumferential direction, and an auxiliary support device for a vane segment used in the method.

BACKGROUND

As a compressor which is a type of rotary machine, there is an axial flow compressor. The axial flow compressor is provided with a rotor rotating about an axis, a casing which covers the rotor allowing the rotor to rotate, and a vane ring formed in an annular shape about the axis and provided on an inner circumferential side of the casing. In this type of axial flow compressor, from the viewpoint of ease of assembly and the like, the casing is able to be split into a top casing and a bottom casing, and the vane ring is also able to be split into a plurality of vane segments in the circumferential direction. In the top casing and the bottom casing, vane ring grooves depressed from the inside in the radial direction toward the outside in the radial direction and extending in the circumferential direction are formed. Each of the vane segments is mounted in the vane ring groove of either the top casing or the bottom casing.

In a case of inspecting and repairing the inside of the rotary machine as described above, it is necessary to detach the top casing. Therefore, Japanese Unexamined Patent Application Publication No. H10-317912A discloses a method in which an upper casing (top casing) is detached from a lower casing (bottom casing) and inverted, and the inside of the upper casing of which an opening faces upward is inspected and repaired.

In addition, Japanese Unexamined Utility Model Application Publication No. H4-109820U discloses a method in which an opening of a casing split in half is made to face upward and a vane segment is drawn out to the upper side from the casing using a chain block or the like.

Problems to be Solved by the Invention

In a case of removing the vane segment attached to the top casing by the method described in Japanese Unexamined Utility Model Application Publication No. H4-109820U, it is necessary to invert the vertical orientation of the top casing by the method described in Japanese Unexamined Patent Application Publication No. H10-317912A. In a case of inverting the top casing in this manner, there is a problem in that it is necessary to use heavy machinery such as a crane for long periods and the necessary costs for inspecting, repairing, or the like increase. Furthermore, in order to invert the top casing, it is necessary that the ceiling of a building housing the rotary machine be high enough to allow the inversion of the top casing, and there is also a problem in that initial costs are high.

SUMMARY OF INVENTION

Therefore, focusing on the problems described above, the present invention aims to provide a method for attaching/removing a vane ring, and a jig for attaching/removing a vane ring, which are able to reduce costs relating to attaching/removing a vane ring to/from a casing.

Means to Solve the Problem

As one aspect of the invention for solving the problems described above, provided is a method for attaching/removing a vane ring in a rotary machine, the rotary machine being provided with a rotor rotating about an axis, a casing covering the rotor allowing the rotor to rotate, and a vane ring formed in an annular shape about the axis and provided on an inner circumferential side of the casing, the vane ring being able to split into a plurality of vane segments in the circumferential direction about the axis, the casing being able to split into a plurality of partial casings in the circumferential direction, vane ring grooves depressed from the inside in the radial direction toward the outside in the radial direction with reference to the axis and extending in the circumferential direction being formed in each of the plurality of partial casings, and the plurality of vane segments being mounted in the vane ring grooves of any partial casing out of the plurality of partial casings, the method comprising: a casing disposing step of disposing a target casing, with a split surface of the target casing, at which the target casing is separated from another partial casing, facing downward, at a workable position where a space is secured such that it is possible to dispose a target segment below the target casing, the target casing being any partial casing out of the plurality of partial casings, and the target segment being the vane segment attached or to be attached to the target casing; and a segment moving step of moving the target segment in the circumferential direction with respect to the target casing disposed at the workable position, and disposing the target segment in the space below the target casing or mounting the target segment in the vane ring groove of the target casing.

In this method for attaching/removing a vane ring, in a case where the target casing is a partial casing which covers the upper side of the rotor, since the vane segment is removed from and attached to the partial casing in a state where the split surface of the split casing faces downward, it is not necessary to invert the vertical orientation of the partial casing. For this reason, when disposing the partial casing by this attaching/removing method, it is not necessary to use heavy machinery such as a crane for long periods, and it is possible to reduce costs for removing and attaching the vane ring. Moreover, in this attaching/removing method, in order to invert the partial casing, it is not necessary to go to the trouble of increasing the height of the ceiling of a building, so that it is possible to save space as well as to reduce initial costs. Therefore, according to this attaching/removing method, it is possible to reduce costs relating to the attachment/removal of the vane ring to/from the casing.

Here, in the method for attaching/removing a vane ring, the casing may have a top casing forming an upper side of the casing and a bottom casing forming a lower side of the casing as the plurality of partial casings, and the target casing may be the top casing.

In addition, in the method for attaching/removing the vane ring in the rotary machine having the top casing and the bottom casing as the partial casings, in the casing disposing step, the top casing may be moved, while maintaining a state where the split surface of the top casing faces downward between a casing-facing position where the top casing is disposed on the bottom casing and the workable position.

In addition, in any of the above methods for attaching/removing a vane ring, in the casing disposing step, by placing the target casing on a casing support base supporting the target casing from below, the target casing may be disposed at the workable position and a state where the target casing is disposed at the workable position may be maintained.

In this method for attaching/removing a vane ring, the target casing is disposed at the workable position by placing the target casing on the casing support base. For this reason, in this attaching/removing method, when attaching/removing the vane segment to/from the target casing at the workable position, it is not necessary to suspend the target casing using a crane or the like. Therefore, according to this attaching/removing method, it is not necessary to use heavy machinery such as a crane for long periods, and it is possible to further reduce costs for removing and attaching the vane ring. Moreover, according to this attaching/removing method, since the target casing is stable when attaching/removing the vane segment, it is possible to easily perform the attachment/removal of the vane segment to/from the target casing.

In addition, in any of the above methods for attaching/removing a vane ring, in the segment moving step, the target segment disposed or to be disposed in the space below the target casing may be received using an auxiliary support device for receiving the target segment.

In this method for attaching/removing a vane ring, when moving the target segment between the target casing and the space below the target casing, it is possible to minimize damage caused by accidental dropping of the target segment by using the auxiliary support device.

In addition, in the method for attaching/removing a vane ring using the auxiliary support device, the auxiliary support device may have a guide rail which is opposed to an outer circumferential surface of the target segment and formed in an arc shape with a curvature corresponding to a curvature of the outer circumferential surface and supports the vane segment, and in the segment moving step, the auxiliary support device may be disposed such that the vane ring groove of the target casing where the target segment is mounted or to be mounted is present on an extension of the arc of the guide rail of the auxiliary support device, and the target segment may be moved along the vane ring groove and the guide rail.

In this method for attaching/removing a vane ring, by moving the target segment along the guide rail, it is possible to easily perform the attachment/removal of the target segment to/from the target casing with little effort.

As one aspect of the invention for solving the problems described above, an auxiliary support device for a vane segment has a guide rail which is opposed to an outer circumferential surface of a vane segment, which forms a part in the circumferential direction of a vane ring formed in an annular shape, and formed in an arc shape with a curvature corresponding to a curvature of the outer circumferential surface and supports the vane segment.

When using this auxiliary support device, the auxiliary support device is disposed such that the vane ring groove of the casing where the vane segment is mounted or to be mounted is present on an extension of the arc of the guide rail of this auxiliary support device. Then, the vane segment is attached to or removed from the casing by moving the vane segment along the arc-shaped guide rail of this auxiliary support device. Accordingly, by using this auxiliary support device, it is possible to easily perform the attachment/removal of the vane segment to/from the casing with little effort.

Here, in the auxiliary support device for the vane segment, a tangential line with respect to one end out of both ends of the guide rail may be oriented in the vertical direction.

In a case where the casing is configured by a top casing and a bottom casing and the split surface of the top casing faces a downward, a tangential line with respect to one end in the circumferential direction of the vane ring groove of the top casing is substantially oriented in the vertical direction. For this reason, in a case where the vane segment is attached to or removed from the top casing using this auxiliary support device in a state where the split surface of the top casing faces downward, it is possible to secure continuity between the guide rail and the vane ring groove of the top casing. Thus, in this case, it is possible to attach/remove the vane segment to/from the vane ring groove of the top casing extremely smoothly.

In addition, in any of the above auxiliary support devices for a vane segment, a plurality of rollers rolling in contact with the vane segment may be provided on the guide rail.

In this auxiliary support device, it is possible to reduce friction when moving the vane segment along the guide rail, and it is possible to easily move the vane segment.

In addition, in any of the above auxiliary support devices for a vane segment, a movable carriage to which the guide rail is attached may be provided.

In this auxiliary support device, it is possible to easily move the vane segment mounted on the guide rail.

Effects of Invention

In the present invention, it is possible to reduce costs relating to attaching/removing a vane ring to/from a casing.

BEST MODE FOR CARRYING OUT THE INVENTION

Below, detailed description will be given of one embodiment of a method for attaching/removing a vane ring and an auxiliary support device for a vane segment used in this method according to the present invention with reference to FIG. 1 to FIG. 17.

First, description will be given of a rotary machine provided with a vane ring.

Figure 1:
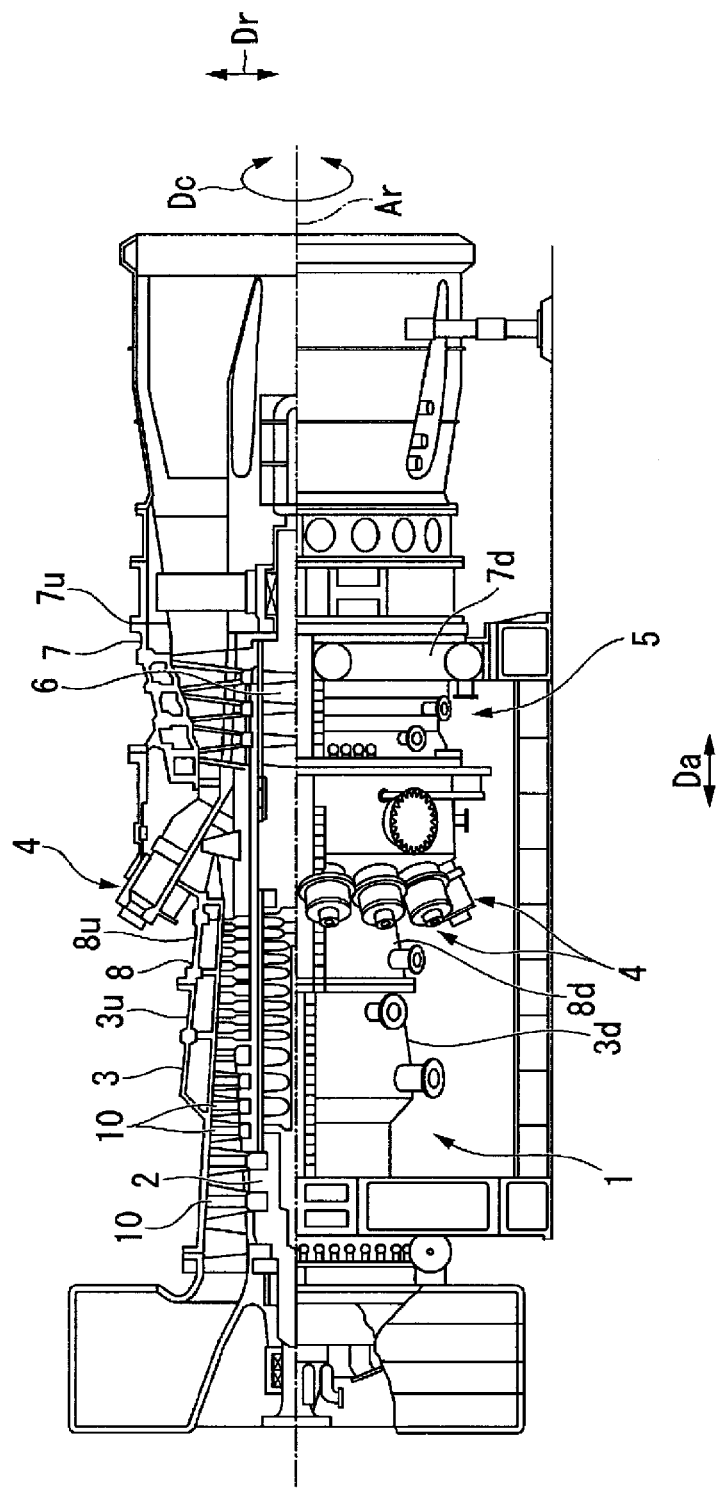
FIG. 1 is a cutaway side view of a main section of a gas turbine in one embodiment according to the present invention.

As illustrated in FIG. 1, a gas turbine is provided with a compressor 1 generating compressed air by compressing outside air, a combustor 4 generating combustion gas by mixing and combusting fuel from a fuel supply source with the compressed air, and a turbine 5 driven by the combustion gas.

The turbine 5 is a rotary machine and has a turbine rotor 6 rotating about an axis Ar and a turbine casing 7 which covers the turbine rotor 6 allowing the turbine rotor 6 to rotate. The compressor 1 is also a rotary machine and has a compressor rotor 2 which rotates about the axis Ar mentioned above, and a compressor casing 3 which covers the compressor rotor 2 allowing the compressor rotor 2 to rotate. This gas turbine further has a compressor and turbine casing 8 which covers the turbine 5 side of the compressor rotor 2 and the compressor 1 side of the turbine rotor 6. The compressor casing 3, the turbine casing 7, and the compressor and turbine casing 8 are all formed in a cylindrical shape about the axis Ar. The compressor casing 3, the turbine casing 7, and the compressor and turbine casing 8 are all able to split into two, top casings 3u, 7u, and 8u and bottom casings 3d, 7d, and 8d, for convenience of assembly. The turbine rotor 6 and the compressor rotor 2 are linked to each other and rotate integrally about the axis Ar.

Hereinafter, the direction in which the axis Ar extends is referred to as the axis direction Da, and the radial direction with respect to the axis Ar is referred to simply as the radial direction Dr. In addition, in the axis direction Da, the compressor 1 side with reference to the turbine 5 is referred to as the upstream side, and the turbine 5 side with reference to the compressor 1 is referred to as the downstream side.

Figure 2:
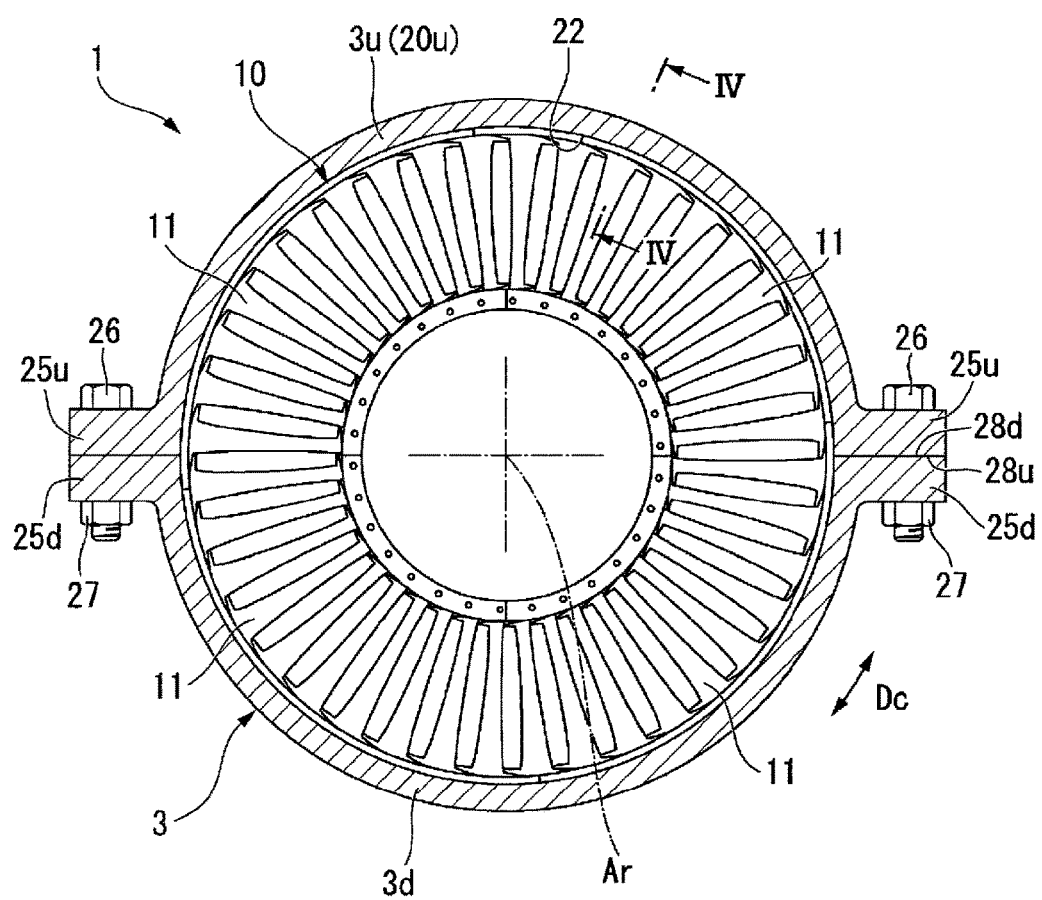
FIG. 2 is a cross-sectional diagram of a compressor in one embodiment according to the present invention.

On the inner circumferential side of the compressor casing 3, a plurality of vane rings 10 which form an annular shape about the axis Ar are provided to line up in the axis direction Da. As illustrated in FIG. 2, each of the vane rings 10 is able to split into a plurality of vane segments 11 in the circumferential direction Dc for convenience of assembly. Here, one of the vane ring 10 is configured by four vane segments 11. In addition, two vane segments 11 out of the four vane segments 11 are attached to the top casing and the remaining two vane segments 11 are attached to the bottom casing. Here, one of the vane ring 10 is configured by four vane segments 11; however, one vane ring may be configured by less than four vane segments 11, for example, by two vane segments, or one vane ring may be configured by five or more, for example, eight vane segments.

The top casings 3u, 7u, and 8u and the bottom casings 3d, 7d, and 8d in the compressor casing 3, the turbine casing 7, and the compressor and turbine casing 8 all have a cross-sectional shape orthogonal to the axis Ar formed in a semi-circular arc shape. In addition, for all of the top casings 3u, 7u, and 8u and the bottom casings 3d, 7d, and 8d, flanges 25u and 25d which project to the outer side in the radial direction are formed at both end sections in the circumferential direction Dc. The top casings 3u, 7u, and 8u and the bottom casings 3d, 7d, and 8d are connected with each other by casing connection bolts 26 passing through the respective flanges and mating flanges, and nuts 27 which are screwed onto the casing connection bolts 26. The surface on the bottom casing side, that is, the surface facing the lower side, of the flanges 25u of the top casings 3u, 7u, and 8u forms a split surface 28u, and the surface on the top casing side, that is, the surface facing the upper side, of the flanges 25d of the bottom casings 3d, 7d, and 8d forms a split surface 28d.

Figure 3:
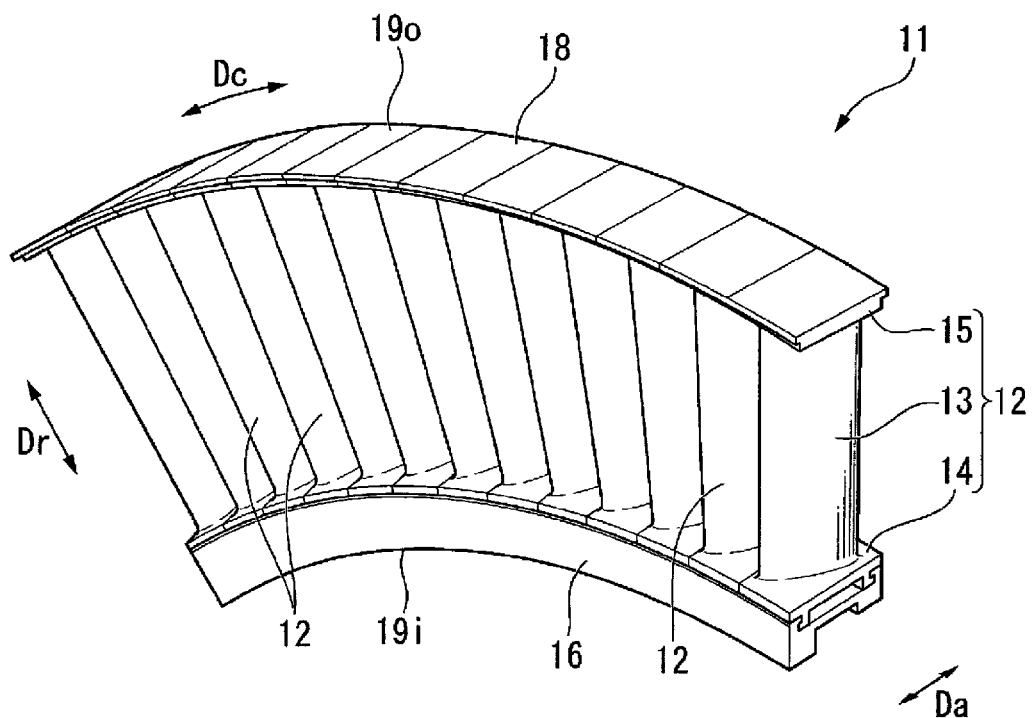
FIG. 3 is a perspective diagram of a vane segment in one embodiment according to the present invention.
Figure 3:

As illustrated in FIG. 3, for each of the vane segments 11, both an outer circumferential surface 19o and an inner circumferential surface 19i form an arc shape about the axis Ar. This vane segment 11 has a plurality of vanes 12 lined up in the circumferential direction Dc, a linking holder 16 on which a portion on the inner side in the radial direction of the plurality of vanes 12 is mounted, and a linking band (not illustrated in the diagram) which links portions on the outer side in the radial direction of the plurality of vanes 12 to one another in the circumferential direction Dc.

The vane 12 has a vane body 13 extending in the radial direction Dr, an inner shroud 14 provided on the inner side in the radial direction of the vane body 13, and an outer shroud 15 provided on the outer side in the radial direction of the wing body 13. The inner shroud 14 of each of the vanes 12 is mounted on the linking holder 16. In addition, the linking band (not illustrated in the diagram) links the outer shrouds 15 of the vanes 12.

Here, the plurality of vanes 12 are linked using the linking holder 16 and the linking band (not illustrated in the diagram) to configure one vane segment 11; however, when linking the plurality of vanes 12, any linking method may be used.

Figure 4:
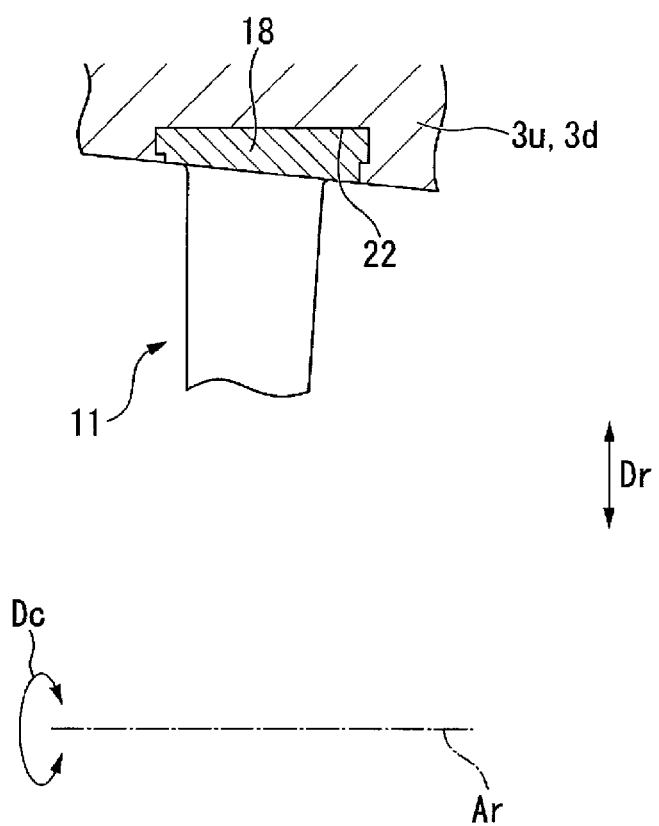
FIG. 4 is a cross-sectional diagram taken along the line IV-IV in FIG. 2.

In the top casing 3u and the bottom casing 3d of the compressor casing 3, as illustrated in FIG. 4, vane ring grooves 22 depressed from the inside in the radial direction toward the outside in the radial direction and extending in the circumferential direction Dc are formed. An outer circumferential section 18 of the vane segment 11 is mounted in the vane ring groove 22. In the present embodiment, the outer circumferential section 18 of the vane segment 11 is configured to have the outer shrouds 15 of the plurality of vanes 12 and a linking band (not illustrated in the diagram) which links these, as illustrated in FIG. 3.

Figure 5:
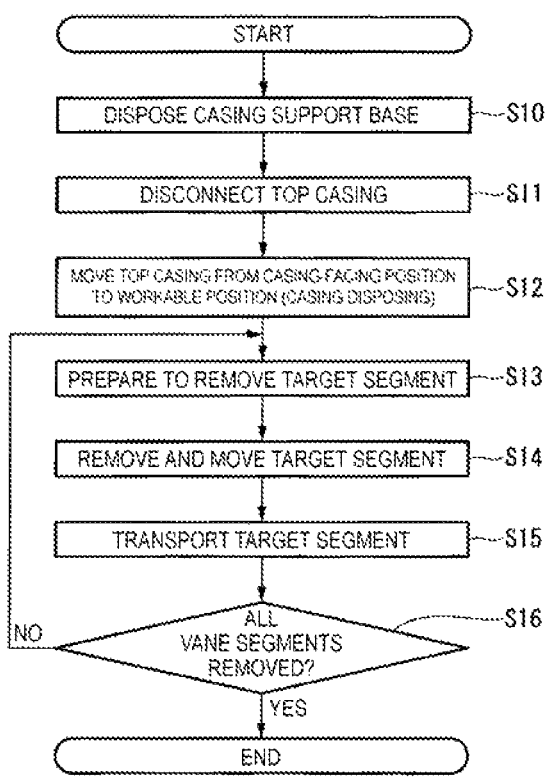
FIG. 5 is a flow chart illustrating a vane ring removal procedure in one embodiment according to the present invention.

Next, description will be given of a removal procedure of the vane ring 10 according to the flow chart illustrated in FIG. 5.

Figure 7:
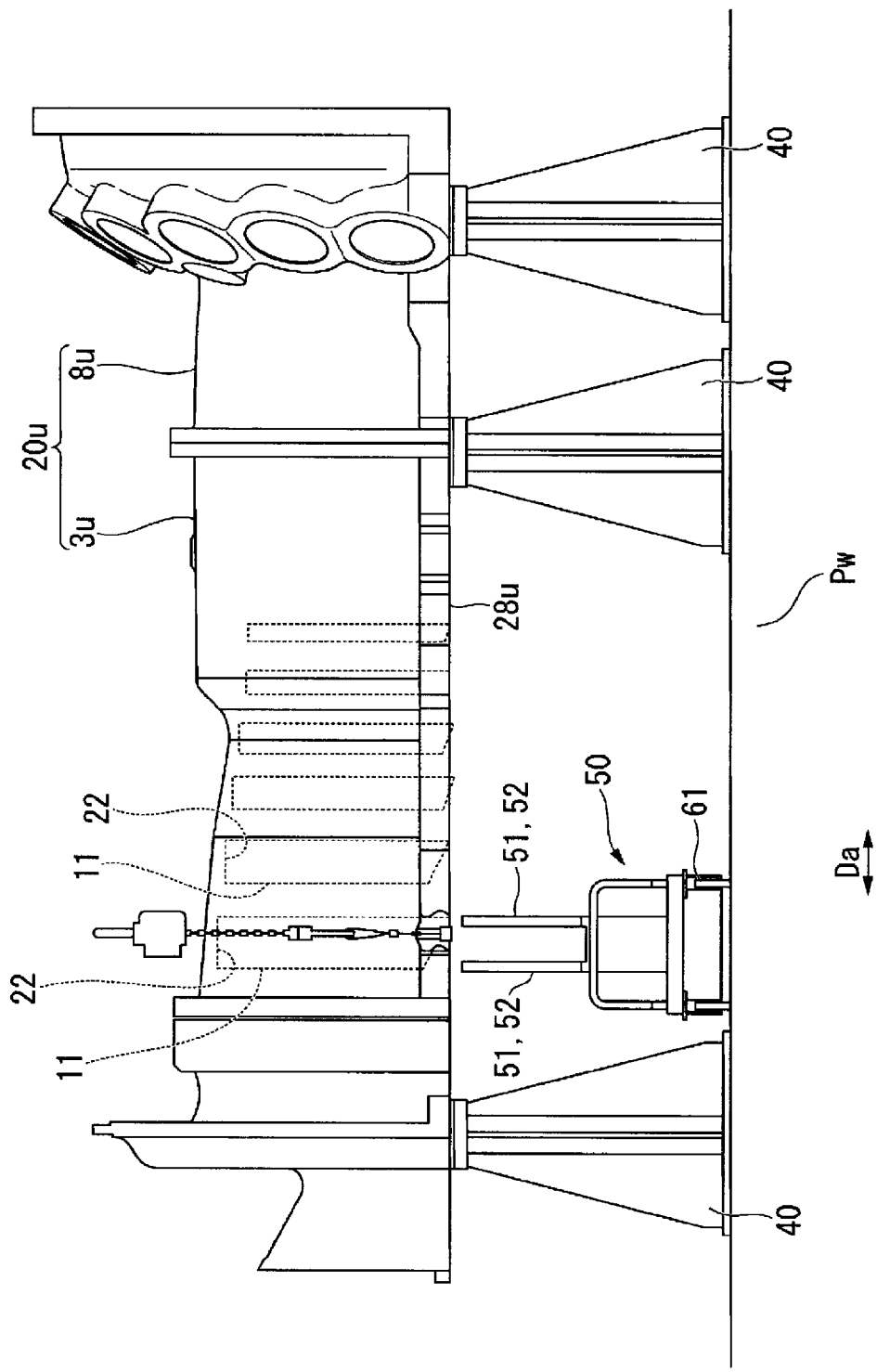
FIG. 7 is a side view of a top casing at a workable position in one embodiment according to the present invention.

First, as illustrated in FIG. 7, in a work area for removing the vane segment 11 from the top casing of the compressor casing 3, a plurality of casing support bases 40 which support each of the top casings of the compressor casing 3 and the compressor and turbine casing 8 from below are disposed (S10: casing support base disposing step).

Next, the casing connection bolts 26 and nuts 27 (illustrated in FIG. 2) which connect the top casing 3u and the bottom casing 3d of the compressor casing 3 with each other are detached, and the casing connection bolts and nuts which connect the top casing 8u and the bottom casing 8d of the compressor and turbine casing 8 with each other are detached (S11: top casing disconnection step).

Next, as illustrated in FIG. 7, in a state where the top casing 3u of the compressor casing 3 and the top casing 8u of the compressor and turbine casing 8 are connected with each other, the top casings 3u and 8u are moved by a crane or the like and placed on the plurality of casing support bases 40 in a work area Pw (S12: casing disposing step). In the casing disposing step (S12), the top casings 3u and 8u are moved while maintaining a state where the split surface 28u of the top casings 3u and 8u faces downward. Hereinafter, unless otherwise stated, the combination of the top casing 3u of the compressor casing 3 and the top casing 8u of the compressor and turbine casing 8 is simply referred to as a top casing 20u. In addition, here, the top casings 3u and 8u are moved in a state where the top casing 3u of the compressor casing 3 and the top casing 8u of the compressor and turbine casing 8 are connected with each other; however, the connection between the top casing 3u of the compressor casing 3 and the top casing 8u of the compressor and turbine casing 8 may be released, only the top casing 3u of the compressor casing 3 may be moved, and only the top casing 3u may be placed on top of the plurality of casing support bases 40.

When the top casing 20u is placed on top of the plurality of casing support bases 40, the top casing 20u is disposed, with the split surface 28u of the top casing 20u facing downward, at a workable position where a space is secured such that it is possible to dispose at least the vane segment 11 below the top casing 20u. That is, in the casing disposing step (S12), the top casing 20u is moved by a crane or the like from a casing-facing position, at which the top casing 20u is placed on the bottom casings 3d and 8d, to the workable position in the work area Pw. While the top casing 20u is placed on top of the plurality of casing support bases 40, the state of being disposed at the workable position is maintained.

Figure 8:
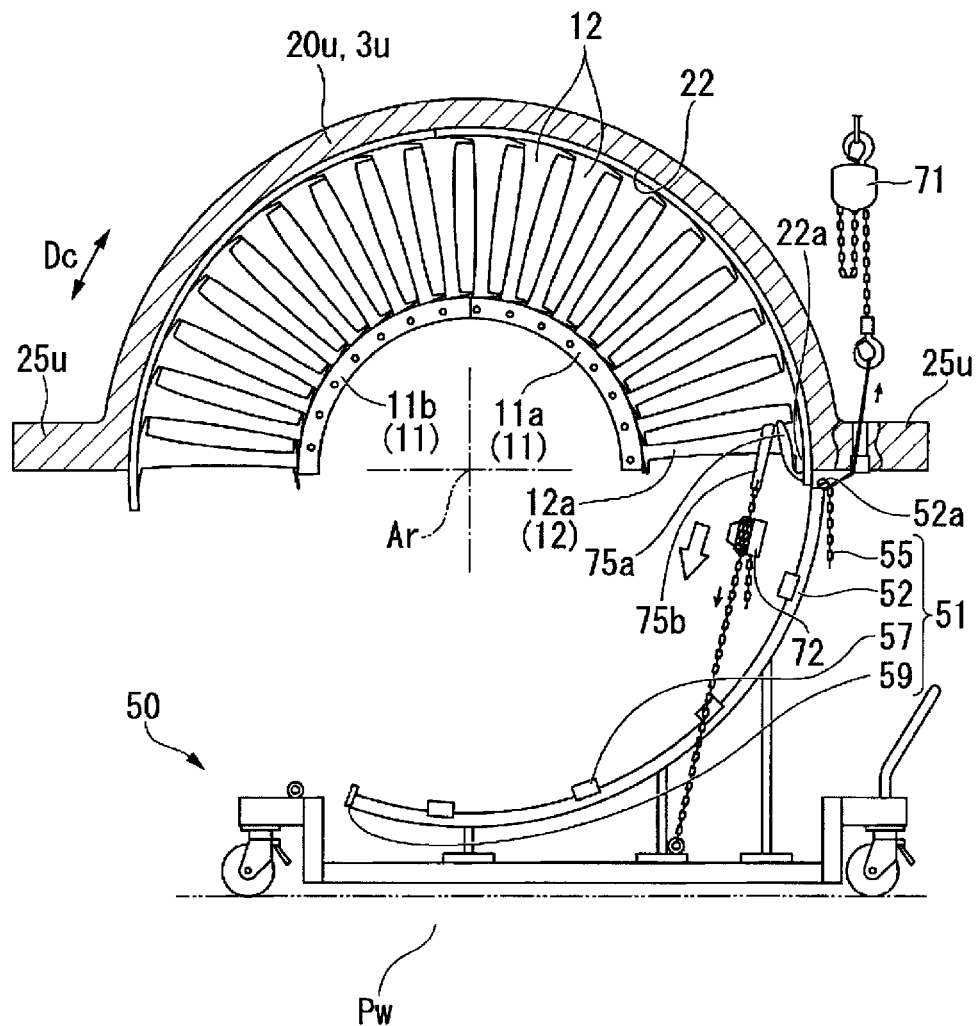
FIG. 8 is an explanatory diagram illustrating a removal preparation step and an attaching and moving step for a vane segment in one embodiment according to the present invention.

Next, as illustrated in FIG. 8, preparation for removing one vane segment 11a out of two vane segments 11 attached to the top casing 20u at the workable position is performed (S13: target segment removal preparation step). Hereinafter, as long as this vane segment 11a is handled, the vane segment 11a is referred to as target segment 11a.

In the removal preparation step (S13) for the target segment 11a, an auxiliary support device 50 receiving the target segment 11a is disposed at a position below the target segment 11a which is attached to the top casing 20u at the workable position.

Figure 16:
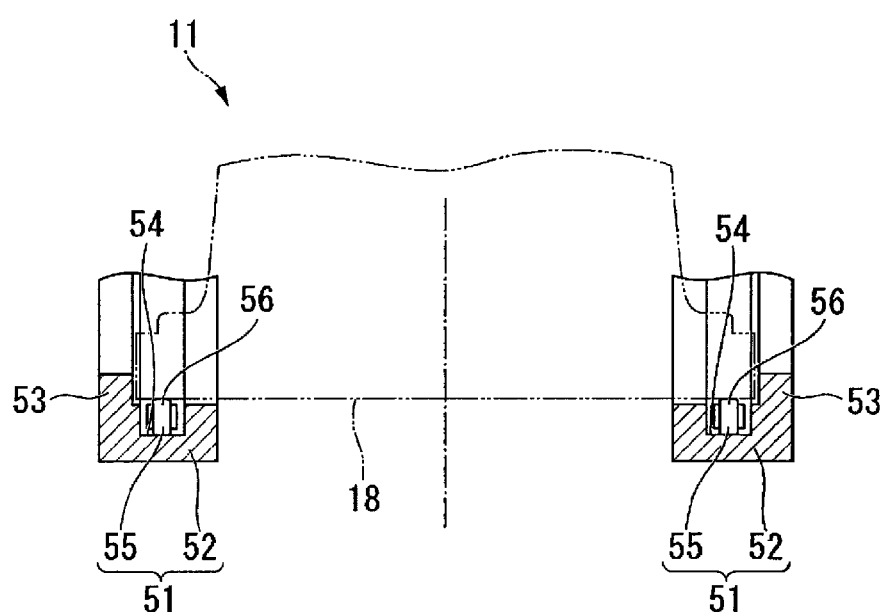
FIG. 16 is a cross-sectional diagram taken along the line XVI-XVI in FIG. 15.
Figure 17:
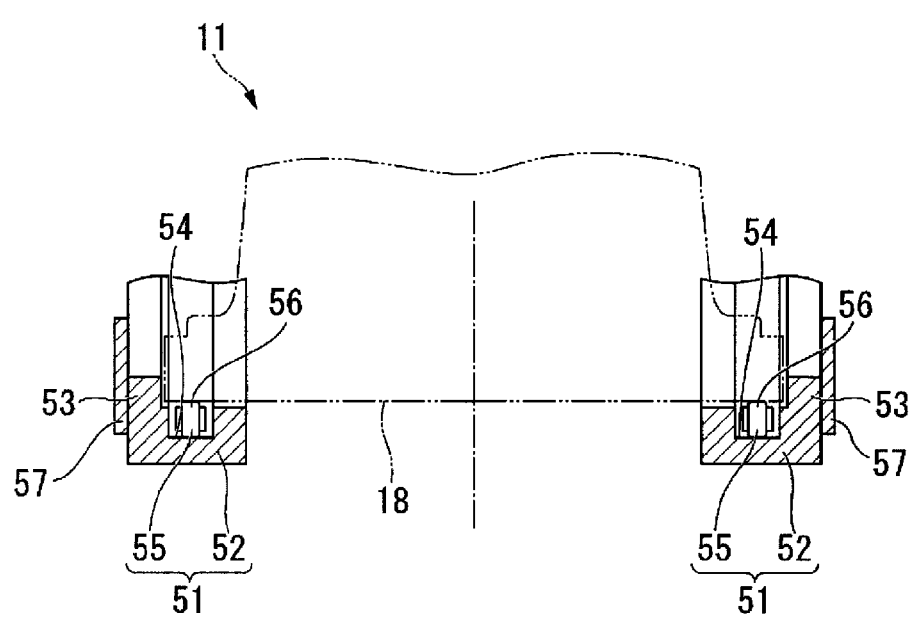
FIG. 17 is a cross-sectional diagram taken along the line XVII-XVII in FIG. 15.

Here, description will be given of the auxiliary support device 50 using FIG. 15 to FIG. 17.

Figure 15:
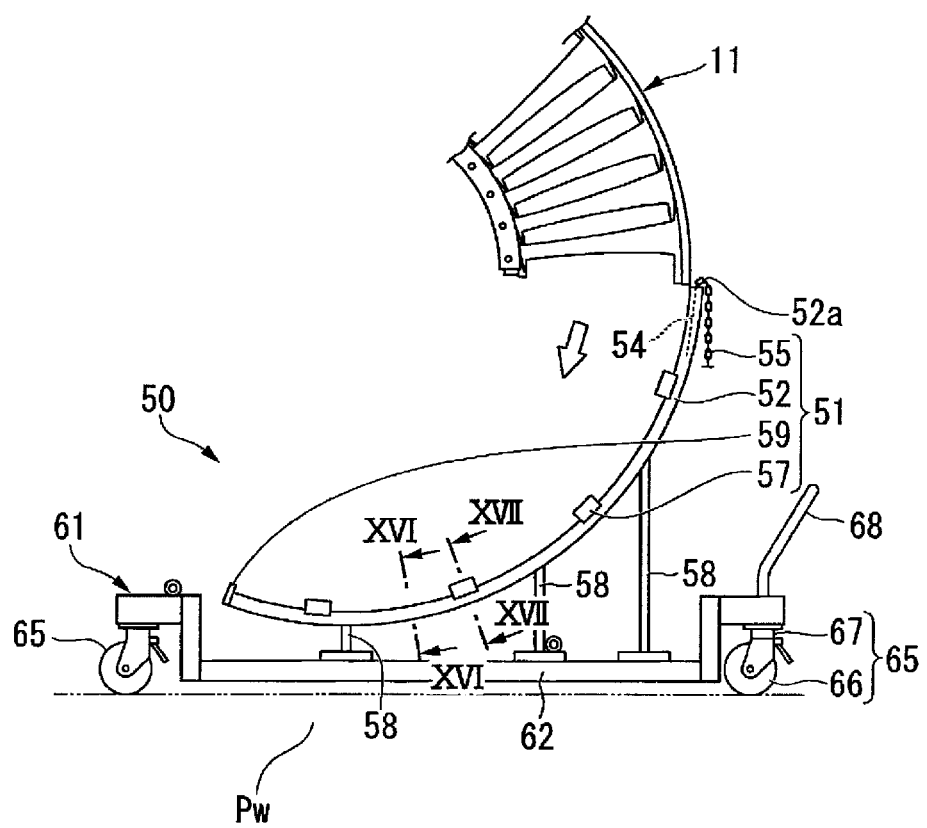
FIG. 15 is a side view of an auxiliary support device in one embodiment according to the present invention.

As illustrated in FIG. 15, the auxiliary support device 50 is provided with a pair of arc-shaped rails 51, a plurality of rail support legs 58 receiving the pair of rails 51, and a carriage 61 to which the rail support legs 58 are attached.

The rails 51 have arc-shaped guide rails 52, roller chains 55 mounted on the guide rails 52, a plurality of falling prevention members 57 attached on the side surface of the guide rail 52, and a pop-out prevention stopper 59 attached to an end section of the guide rail 52 in the longitudinal direction (circumferential direction). The guide rail 52 forms an arc shape with a curvature corresponding to a curvature of the outer circumferential surface 190 (illustrated in FIG. 3) of the vane segment 11. The roller chains 55 are ones commercially available and have, for example, a plurality of links, a pin linking the links to each other, and rollers 56 (illustrated in FIG. 16 and FIG. 17) rotatably attached to the pin. On the guide rail 52, as illustrated in FIG. 16 and FIG. 17, chain grooves 54, in which the roller chains 55 are mounted, and flanges 53, which regulate the movement of the vane segments 11 in the horizontal direction which is a direction orthogonal to the direction in which the guide rail 52 extends, are formed. The chain grooves 54 are depressed from the center side of the arc in the arc-shaped guide rail 52 toward the outside and extend in the direction in which the guide rail 52 extends. An interval between the flange 53 of one rail 51 out of the pair of rails 51 and the flange 53 of the other rail 51 is an interval which is slightly larger than the width in the axis direction Da in the outer circumferential section 18 of the vane segment 11. The vane segment 11 is placed on the roller chains 55 mounted on the guide rail 52 in a state where the outer circumferential section 18 is interposed between the pair of flanges 53. As illustrated in FIG. 15, a tangential line with respect to one end 52a out of both ends of the guide rail 52 is substantially oriented in the vertical direction. In addition, the pop-out prevention stopper 59 mentioned above is attached to the other end of the guide rail 52. The plurality of falling prevention members 57 mentioned above are attached on the side surface of the guide rail 52 in the longitudinal direction (circumferential direction) of the guide rail 52. As illustrated in FIG. 17, the falling prevention member 57 is attached to each of the guide rails 52 on the side surface on the opposite side from the other guide rail 52.

As illustrated in FIG. 15, the carriage 61 has a frame 62 to which the plurality of rail support legs 58 are attached, four casters 65, and a handle 68. The frame 62 forms a rectangle in plan view. The casters 65 have wheels 66, and wheel support seats 67 rotatably supporting the wheels 66. The casters 65 are each attached below the four corners of the rectangular frame 62. The handle 68 is gripped when an operator moves the carriage 61, and is fixed to the frame 62.

The rails 51 of the auxiliary support device 50 in the present embodiment have the arc-shaped guide rails 52 and the roller chains 55 mounted on the guide rails 52; however, the rails 51 may have a plurality of rollers rotatably pivotally-supported on the guide rails 52 instead of the roller chains 55. In addition, since the roller chains 55 and the rollers are both for reducing friction between the vane segments 11 and the guide rails 52 accompanying the movement of the vane segments 11, neither is essential.

In the disposition of the auxiliary support device 50 in the removal preparation step (S13), as illustrated in FIG. 7 and FIG. 8, the auxiliary support device 50 is disposed such that the arc-shaped vane ring groove 22 in which the target segment 11a is mounted is present below the target segment 11a, which is one vane segment 11a out of the two vane segments 11a and 11b configuring a part (upper half portion)

of one vane ring 10, and on an extension of the arc of the pair of guide rails 52 of the auxiliary support device 50. More specifically, the auxiliary support device 50 is disposed such that an end 22a on the side, on which the target segment 11a is present, out of both ends of the arc-shaped vane ring groove 22 in which the target segment 11a is mounted is present on an extended line of the tangential line in one end 52a of the pair of guide rails 52.

Next, two bands 75a and 75b are attached to a first end vane 12a, which is positioned on the end section in the circumferential direction Dc and closest to the auxiliary support device 50 side, out of the plurality of vanes 12 which configure the target segment 11a. Subsequently, an end section or a hook of the chains of a first chain block 71 suspended from above is attached to one band 75a. Furthermore, an end section or a hook of the chains of a second chain block 72 attached to a position below the guide rail 52 of the auxiliary support device 50 is attached to the other band 75b. Out of the two chain blocks 71 and 72, the first chain block 71 suspended from above is used for falling prevention which prevents rapid falling of the target segment 11a. In addition, the second chain block 72 attached to the lower position is used for drawing out the target segment 11a downward from the vane ring groove 22 of the top casing 20u.

As described above, when the setting of the first chain block 71 and the second chain block 72 is finished, the removal preparation step (S13) of the target segment 11a is completed.

Next, a movement regulating tool (not illustrated in the diagram), which regulates movement of the target segment 11a in the circumferential direction Dc with respect to the vane ring groove 22 of the top casing 20u, is detached. Subsequently, the target segment 11a is drawn out downward from the vane ring groove 22 of the top casing 20u by operating each of the chain blocks 71 and 72 (S14: target segment removal and moving step). At this time, while gradually loosening the tension of the chains of the first chain block 71 for falling prevention, the chains of the second chain block 72 for drawing out are wound up. With the operation of the chain blocks 71 and 72, the target segment 11a moves along the vane ring groove 22 in a direction which is the circumferential direction Dc and in which the first end vane 12a described above in oriented downward.

When the target segment 11a starts moving, the target segment 11a moves along the pair of arc-shaped rails 51 while contacting the pair of rails 51 of the auxiliary support device 50. Specifically, the rollers 56 of the roller chains 55 in the pair of rails 51 contact the outer circumferential surface 19o of the target segment 11a. In accordance with the movement of the target segment 11a, the roller chains 55 move inside the chain grooves 54 of the arc-shaped guide rails 52 while the rollers 56 rotate.

Figure 9:
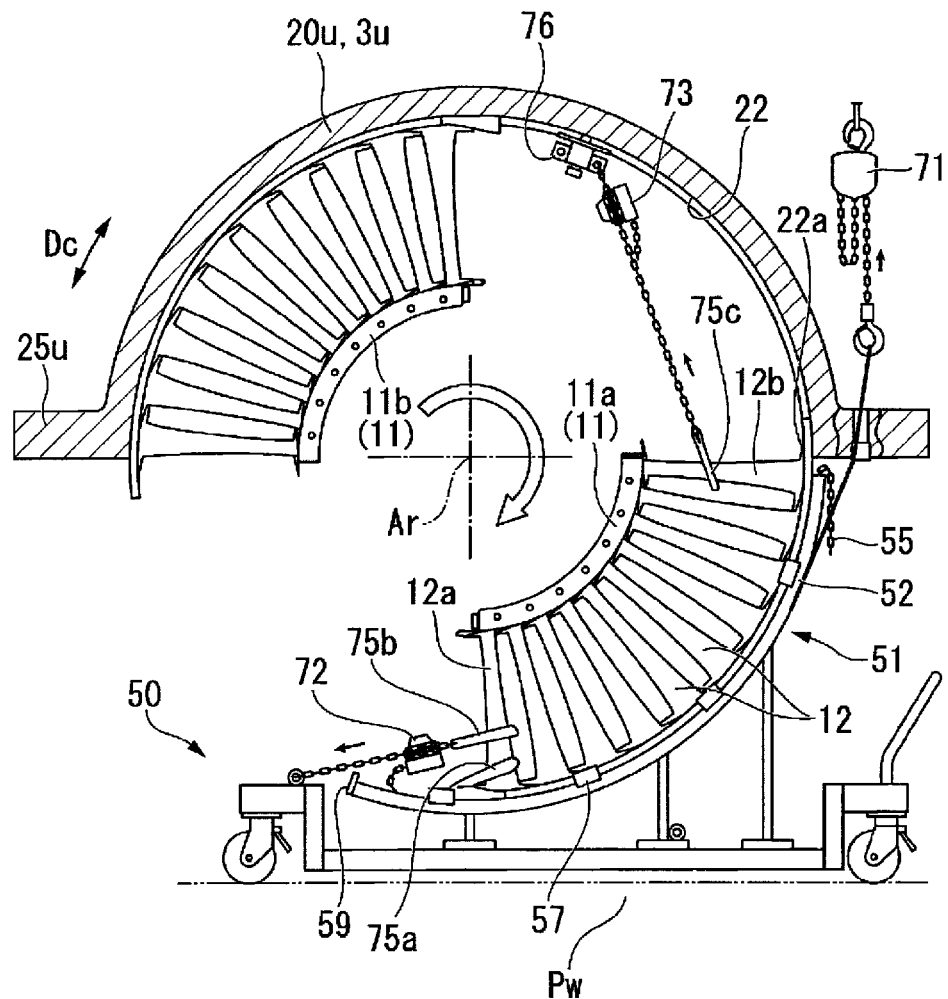
FIG. 9 is an explanatory diagram illustrating a removal and moving step and an attachment preparation step for a vane segment in one embodiment according to the present invention.

When the target segment 11a moves a certain amount, as illustrated in FIG. 9, a chain block attaching jig 76 is attached to a position in the vane ring groove 22 of the top casing 20u made vacant by the movement of the target segment 11a. Furthermore, a band 75c is attached to a second end vane 12b, which is positioned on the end section in the circumferential direction Dc and positioned furthest from the auxiliary support device 50 side, out of the plurality of vanes 12 which configure the target segment 11a. Then, a third chain block 73 is attached to the chain block attaching jig 76, and the band 75c which is attached to the second end vane 12b is attached to an end section or a hook of the chains of the third chain block 73. The third chain block 73 is used for falling prevention which prevents rapid falling of the target segment 11a in the same manner as the first chain block 71 suspended from above. For this reason, with respect to the third chain block 73, an operation of gradually loosening the tension of the chains is carried out in the same manner as the first chain block 71 suspended from above.

In the process in which the target segment 11a moves on the pair of rails 51 of the auxiliary support device 50, it is possible to prevent the target segment 11a from falling off to the side from the pair of rails 51 by using the falling prevention members 57 attached to the side surfaces of the guide rails 52.

Figure 10:
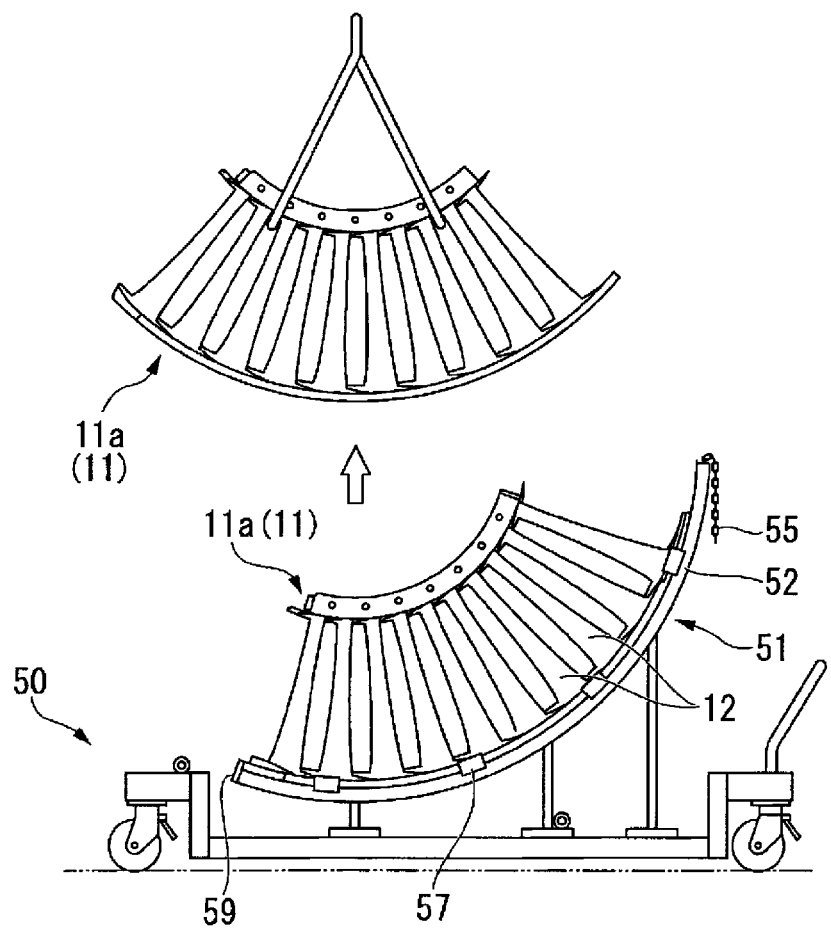
FIG. 10 is an explanatory diagram illustrating a transport step for a vane segment in one embodiment according to the present invention.

As illustrated in FIG. 10, when the entirety of the target segment 11a is placed on the pair of rails 51 of the auxiliary support device 50, the target segment 11a is completely removed from the top casing 20u. At this time, the target segment 11a is prevented from popping out from the other end of the guide rail 52 by the pop-out prevention stopper 59. Then, all of the chain blocks 71, 72, and 73 illustrated in FIG. 9 are detached from the respective attachment positions.

Next, the target segment 11a removed from the top casing 20u is transported to, for example, an inspection area, a repair area, or the like (S15: target segment transport step). At this time, firstly, the regulation of the movement of the carriage 61 is released by operating a stopper (not illustrated in the diagram) of the auxiliary support device 50. Subsequently, as illustrated in FIG. 10, the auxiliary support device 50 on which the target segment 11a is placed is moved from the position below the top casing 20u. In this process, since the movement of the target segment 11a on the auxiliary support device 50 relative to the guide rail 52 is regulated by the falling prevention members 57 and the pop-out prevention stopper 59 attached to the guide rails 52 of the auxiliary support device 50, it is possible to transport the target segment 11a in a stable state. Then, the target segment 11a on the auxiliary support device 50 is raised and moved to the inspection area or the like.

Next, it is confirmed whether any of the vane segments 11 are not yet removed from the top casing 20u, in other words, whether all of the vane segments 11 have been removed from the top casing 20u (S16).

In a case where any of the vane segments 11 is not yet removed from the top casing 20u, the removal preparation step (S13) of the vane segment 11, the removal and moving step (S14) of the vane segment 11, and the transport step (S15) of the vane segment 11 are also executed in the same manner as above with respect to the one vane segment 11 not yet detached from the top casing 20u to below the top casing 20u.

Figure 11:
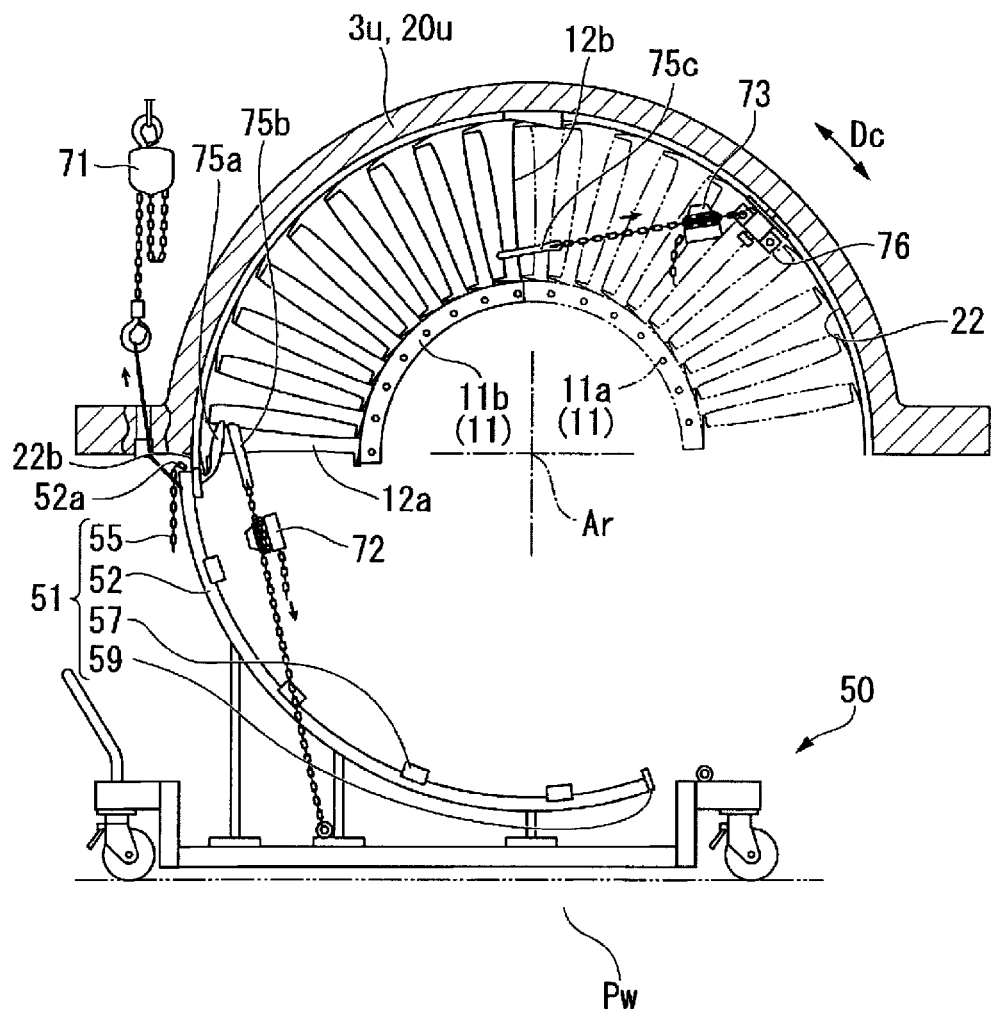
FIG. 11 is an explanatory diagram illustrating a removal preparation step and an attaching and moving step for another vane segment in one embodiment according to the present invention.

However, as illustrated in FIG. 11, in a case where the vane segment 11b being handled here configures a part (upper half portion) of one vane ring 10 together with the vane segment 11a removed earlier, the removal preparation step (S13) of the vane segment 11b being handled here is slightly different from the removal preparation step (S13) with respect to the vane segment 11a forming a set with the vane segment 11b. Hereinafter, as long as this vane segment 11b is handled, the vane segment 11b is referred to as target segment 11b.

In the removal preparation step (S13) of the target segment 11b as well, as illustrated in FIG. 11, the auxiliary support device 50 is disposed at a position below the target segment 11b. More specifically, the auxiliary support device 50 is disposed such that an end 22b on the side on which the target segment 11b is present out of both ends of the arc-shaped vane ring groove 22, in which the target segment 11b is mounted, is present on an extended line of the tangential line in one end 52a of the pair of guide rails 52. For this reason, compared with when the auxiliary support device 50 (FIG. 8) is disposed in the removal preparation step (S13) with respect to the vane segment 11a forming a set with the target segment 11b, when the auxiliary support device 50 (FIG. 11) is disposed in the removal preparation step (S13) of the target segment 11b, the position of the one end 52a of the guide rail 52 is at a symmetric position with reference to the axis Ar, and the orientation of the auxiliary support device 50 is different.

In addition, the plurality of chain blocks 71, 72, and 73 are set in the removal preparation step (S13) of the target segment 11b, as well. In other words, out of the plurality of vanes 12 which configure the target segment 11b, the two bands 75a and 75b are attached to the first end vane 12a which is positioned on the end section in the circumferential direction Dc and positioned closest to the auxiliary support device 50 side. Subsequently, an end section or a hook of the chains of the first chain block 71 suspended from above is attached to one band 75a. Furthermore, an end section or a hook of the chains of the second chain block 72 attached to a position below the rails 51 of the auxiliary support device 50 is attached to the other band 75b.

Here, furthermore, in the vane ring groove 22 in which the target segment 11b is mounted, the chain block attaching jig 76 is attached to a position made vacant by the removal of the vane segment 11a forming a set with the target segment 11b. Subsequently, the band 75c is attached to the second end vane 12b, which is positioned on the end section in the circumferential direction Dc and positioned furthest from the auxiliary support device 50 side, out of the plurality of vanes 12 which configure the target segment 11b. Then, the third chain block 73 is attached to the chain block attaching jig 76, and the band 75c which is attached to the second end vane 12b is attached to an end section or a hook of the chains of the third chain block 73.

That is, in the removal preparation step (S13) of the target segment 11b, the third chain block 73, which is set in the removal and moving step (S14) of the vane segment 11a forming a set with the target segment 11b, is also set along with the first and second chain blocks 71 and 72.

Figure 12:
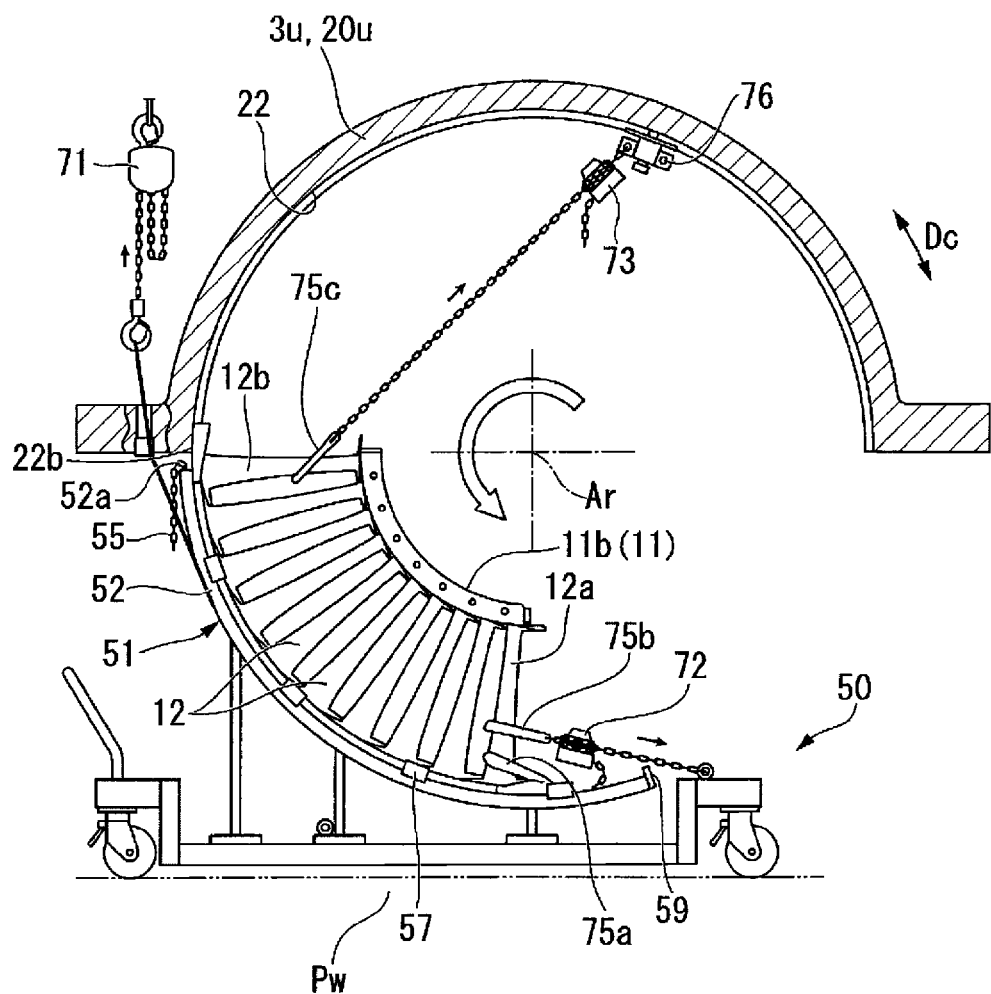
FIG. 12 is an explanatory diagram illustrating a removal and moving step and an attachment preparation step for another vane segment in one embodiment according to the present invention.
Figure 13:
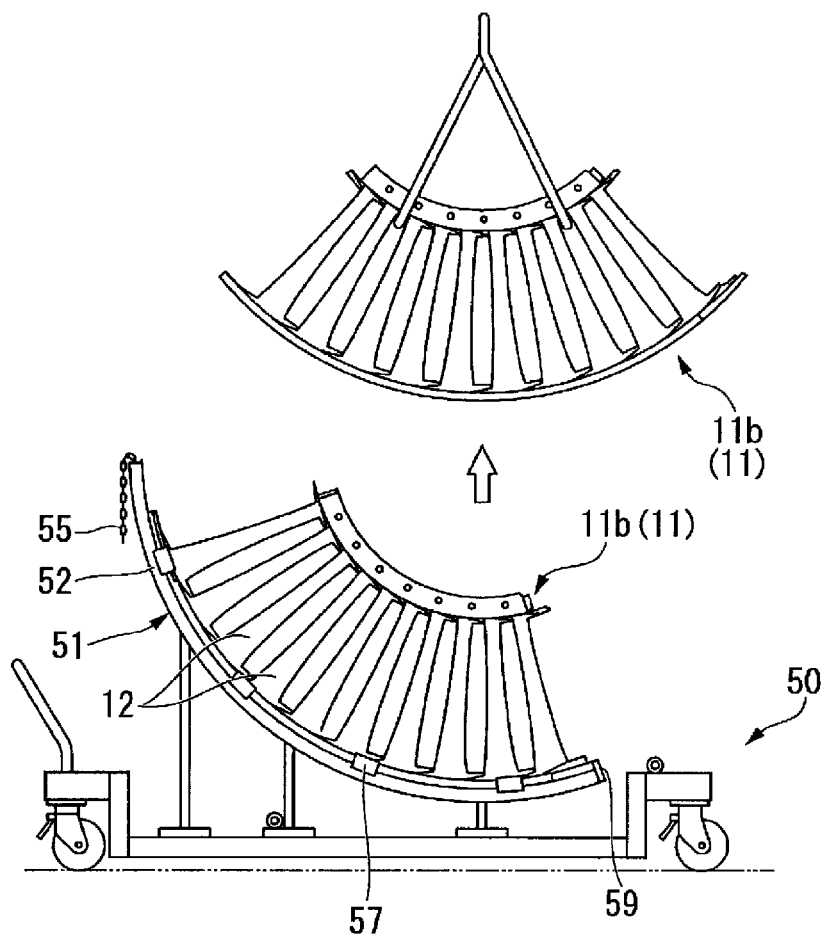
FIG. 13 is an explanatory diagram illustrating a transport step for another vane segment in one embodiment according to the present invention.

When the removal preparation step (S13) of the target segment 11b is completed, thereafter, the removal and moving step (S14) of the target segment 11b as illustrated in FIG. 12, and the transport step (S15) of the target segment 11b as illustrated in FIG. 13 are executed in the same manner as the processes with respect to the vane segment 11a forming a set with the target segment 11b.

Then, when it is confirmed that all of the vane segments 11 have been removed from the top casing 20u (S16), the removal of all of the vane segments 11 from the top casing 20u is completed.

The removal of the vane segment 11 from the bottom casings 3d and 8d is basically performed without moving the bottom casings 3d and 8d. At this time, by raising up the vane segment 11 from the bottom casings 3d and 8d along the vane ring groove 22, the vane segment 11 is removed from the bottom casings 3d and 8d.

Figure 6:
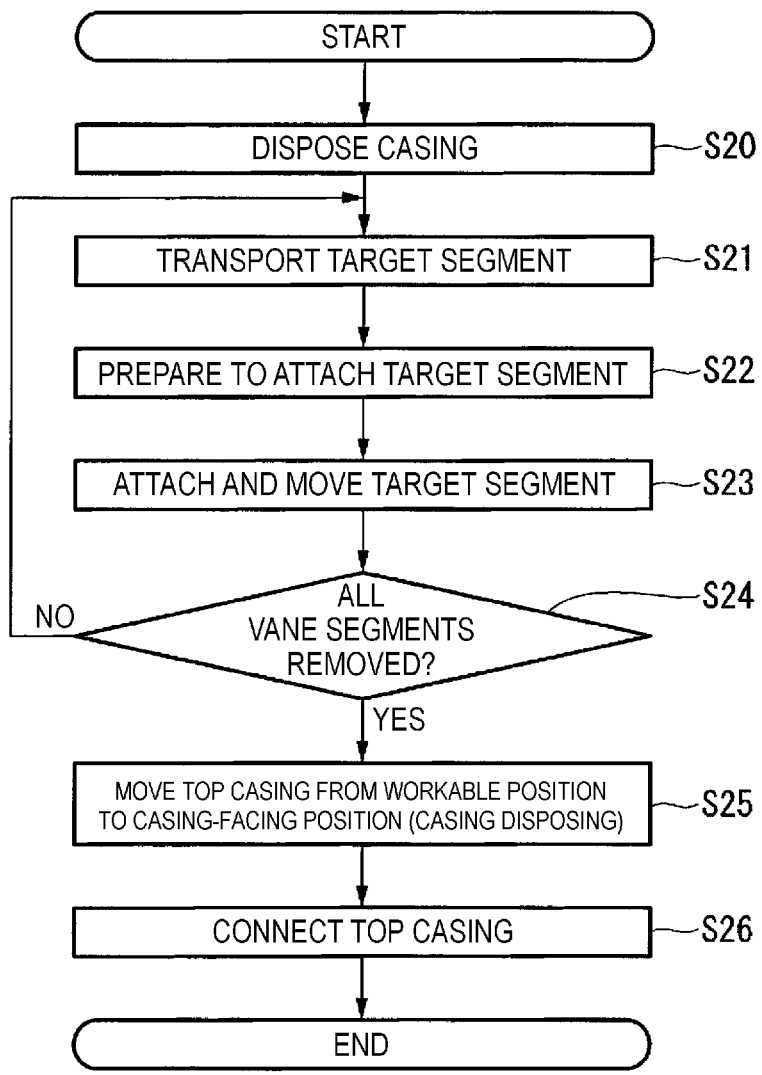
FIG. 6 is a flow chart illustrating a vane ring attachment procedure in one embodiment according to the present invention.

Next, description will be given of an attachment procedure of the vane ring 10 according to the flow chart illustrated in FIG. 6.

First, the top casing 20u is placed on the plurality of casing support bases 40, that is, the top casing 20u is disposed at the workable position (S20: casing disposing step). However, here, since the state where the top casing 20u is disposed at the workable position during removal of the vane ring 10 is maintained, the casing disposing step (S20) is not executed again in the process of removing the vane ring 10.

Next, one vane segment 11b is transported from the inspection area, the repair area, or the like to the work area Pw for the attachment work (S21: target segment transport step). Hereinafter, as long as this one vane segment 11b is handled, the vane segment 11b is referred to as target segment 11b. At this time, as illustrated in FIG. 13, the target segment 11b transported from the inspection area, the repair area, or the like is placed on the auxiliary support device 50.

Next, the preparation for attaching the target segment 11b to the top casing 20u is performed (S22: target segment attachment preparation step).

In the attachment preparation step (S22) of the target segment 11b, firstly, as illustrated in FIG. 12, the auxiliary support device 50 on which the target segment 11b is placed is disposed below the vane ring groove 22 of the top casing 20u on which the target segment 11b is to be mounted. In the disposition of the auxiliary support device 50 as well, in the same manner as in the case of the disposition of the auxiliary support device 50 performed in the removal process of the vane segment 11, the auxiliary support device 50 is disposed such that the arc-shaped vane ring groove 22 in which the target segment 11b is to be mounted is present on an extension of the arc of the pair of guide rails 52 of the auxiliary support device 50. More specifically, the auxiliary support device 50 is disposed such that the end 22b on the side on which the target segment 11b is to be mounted, out of both ends of the arc-shaped vane ring groove 22 in which the target segment 11b is to be mounted is present on an extended line of the tangential line of the one end 52a of the pair of guide rails 52.

Next, the chain block attaching jig 76 is attached to a position, which is still vacant after mounting the target segment 11b in the vane ring groove 22, in the vane ring groove 22 of the top casing 20u in which the target segment 11b is to be mounted. Furthermore, the band 75c is attached to the second end vane 12b, which is positioned on the end section in the circumferential direction Dc and positioned on the side closest to the top casing 20u, out of the plurality of vanes 12 configuring the target segment 11b. In addition, the band 75a is also attached to the first end vane 12a positioned on the other end section in the circumferential direction Dc. Then, an end section or a hook of the chains of the first chain block 71 suspended from above is attached to the band 75a attached to the first end vane 12a. In addition, the third chain block 73 is attached to the chain block attaching jig 76, and the band 75c which is attached to the second end vane 12b is attached to an end section or a hook of the chains of the third chain block 73. The first chain block 71 and the third chain block 73 fulfill a role of attaching the target segment 11b to the top casing 20u. In the attachment of the vane ring 10, the second chain block 72 used when removing the vane ring 10 is not used.

As described above, when the setting of the first chain block 71 and the third chain block 73 is completed, the attachment preparation step (S22) of the target segment 11b is completed.

Next, as illustrated in FIG. 11, the target segment 11b on the auxiliary support device 50 is drawn upward by operating the first chain block 71 and the third chain block 73 (S23: target segment attaching and moving step). At this time, the chains of the first chain block 71 and the third chain block 73 are wound up. With the operation of the first chain block 71 and the third chain block 73, the target segment 11b moves along the pair of guide rails 52 of the auxiliary support device 50 and the vane ring groove 22 of the top casing 20*u* in a direction which is the circumferential direction Dc and in which the second end vane 12*b* described above is oriented upward.

When the target segment 11*b* is completely mounted in the vane ring groove 22 of the top casing 20*u*, the movement regulating tool (not illustrated in the diagram) which regulates the movement of the target segment 11*b* in the circumferential direction Dc with respect to the top casing 20*u* is attached. Then, both of the chain blocks 71 and 73 are removed from the respective attachment positions. Thus, the attaching and moving step (S23) is completed with respect to the target segment 11*b*.

Next, it is confirmed whether all of the vane segments 11 have been attached to the top casing 20*u* (S24). In a case where any of the vane segments 11 is not yet attached to the receiving casing, in the same manner as above, the transport step (S21) of the vane segment 11, the attachment preparation step (S22) of the vane segment 11, and the attaching and moving step (S23) of the vane segment 11 are executed.

However, in a case where the vane segment 11 being handled here configures a part (upper half portion) of one vane ring 10 together with the vane segment 11*b* attached earlier, the attaching and moving step (S23) of the vane segment 11*a* being handled here is slightly different from the attaching and moving step (S23) with respect to the vane segment 11*b* forming a set with the vane segment 11*a*. Hereinafter, as long as this vane segment 11*a* is handled, the vane segment 11*a* is referred to as the target segment 11*a*.

Figure 14:
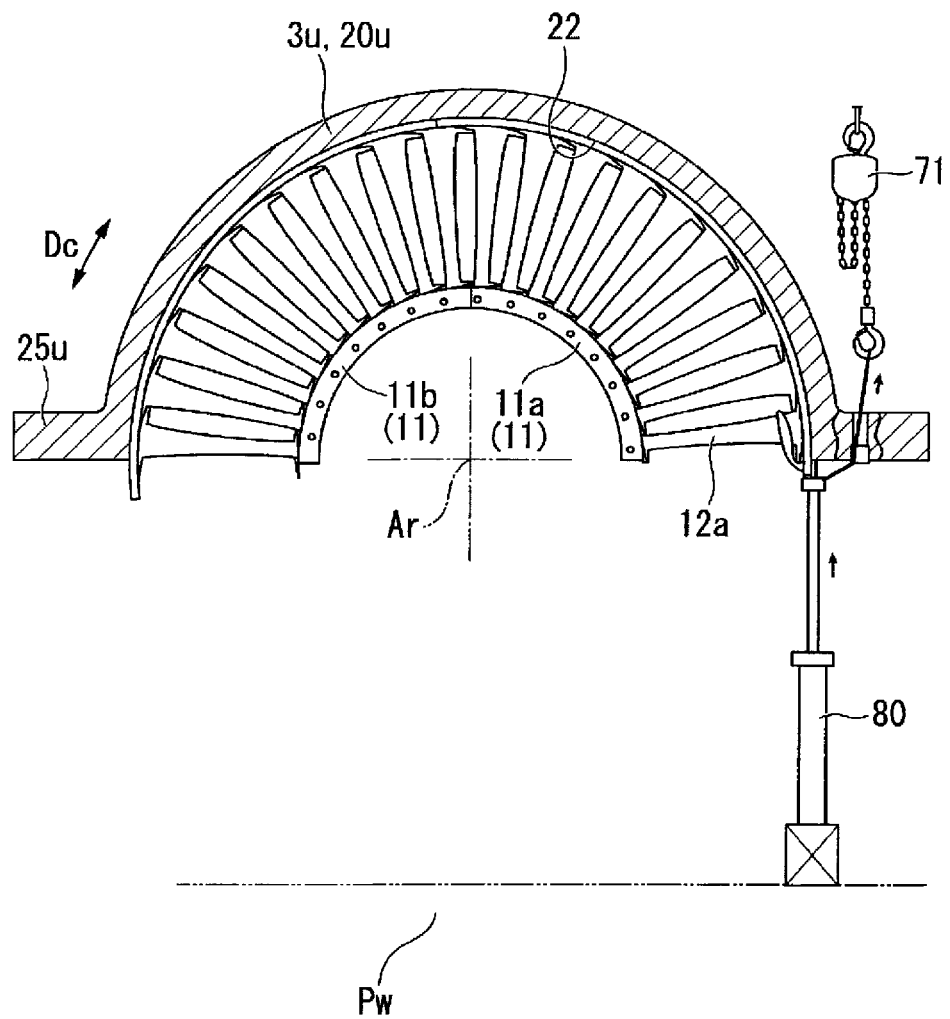
FIG. 14 is an explanatory diagram illustrating the attaching and moving step for a vane segment in one embodiment according to the present invention.

In the attaching and moving step (S23) of the target segment 11*a* as well, the target segment 11*a* on the auxiliary support device 50 is raised up by operating the first chain block 71 and the third chain block 73. When the target segment 11*a* is mounted to a certain extent in the vane ring groove 22 of the top casing 20*u*, the vacant portion is reduced in the vane ring groove 22 due to the already mounted vane segment 11*b* which forms a set with the target segment 11*a*. For this reason, in the vane ring groove 22, the region where the chain block attaching jig 76, to which the third chain block 73 is attached, can be attached disappears. Thus, in the attaching and moving step (S23) of the target segment 11*a*, when the target segment 11*a* is mounted to a certain extent in the vane ring groove 22 of the top casing 20*u*, the third chain block 73 and the chain block attaching jig 76 are removed. Instead, as illustrated in FIG. 14, a jack 80 is disposed below the target segment 11*a* and the target segment 11*a* is pushed upward by the jack 80.

When the target segment 11*a* is completely mounted in the vane ring groove 22 of the top casing 20*u*, in the same manner as the attaching and moving step (S23) previously described, the movement regulating tool which regulates the movement of the target segment 11*a* in the circumferential direction Dc with respect to the top casing 20*u* is attached. Subsequently, the first chain block 71 and the jack 80 are removed from the respective attachment positions.

Then, when it is confirmed that all of the vane segments 11 have been attached to the top casing 20*u* (S24), the attachment of all the vane segments 11 to the top casing 20*u* is completed.

The attachment of the vane segments 11 to the bottom casings 3*d* and 8*d* is basically performed without moving the bottom casings 3*d* and 8*d*. At this time, the vane segment 11 is attached to the bottom casings 3*d* and 8*d* by pushing the vane segment 11 downward along the vane ring groove 22 with respect to the bottom casings 3*d* and 8*d*.

As described above, when the attachment of all of the vane segments 11 is completed, the top casing 20*u* is moved from the workable position to the casing-facing position described above using a crane or the like (S25: casing disposing). When moving the top casing 20*u* as well, in the same manner as when moving the top casing 20*u* during the attachment of the vane segments 11, the top casing 20*u* is moved while maintaining a state where the split surface 28*u* of the top casing 20*u* faces downward.

Next, the top casing 20*u* and the bottom casings 3*d* and 8*d* are connected with each other by the casing connection bolts 26 and the nuts 27 (S26). Thus, the attachment operation of the vane ring 10 is completed.

As described above, in the present embodiment, since the vane segment 11 is removed from and attached to the top casing 20*u* in a state where the split surface 28*u* of the top casing 20*u* faces downward, there is no need to invert the vertical orientation of the top casing 20*u*. For this reason, in the present embodiment, when disposing the top casing 20*u*, it is not necessary to use heavy machinery such as a crane for long periods, and it is possible to reduce costs for removing and attaching the vane ring 10. Moreover, in the present embodiment, it is not necessary to go to the trouble of increasing the height of the ceiling of the building in order to invert the top casing 20*u*, so that it is possible to save space, as well as to reduce initial costs. That is, in the present embodiment, it is possible to reduce costs relating to attaching/removing the vane ring 10 to/from the casing.

In addition, in the present embodiment, by placing the top casing 20*u* on the casing support base 40, the top casing 20*u* is disposed at the workable position. For this reason, in the present embodiment, when attaching/removing the vane segments 11 to/from the top casing 20*u* at the workable position, it is not necessary to suspend the top casing 20*u* using a crane or the like. Thus, according to the present embodiment, it is not necessary to use heavy machinery such as a crane for long periods, and it is possible to further reduce costs for removing and attaching the vane ring 10 from this viewpoint as well. Moreover, in the present embodiment, when attaching/removing the vane segment 11, since the top casing 20*u* is stable, it is possible to easily perform the attachment/removal of the vane segment 11 to/from the top casing 20*u*.

In addition, in the present embodiment, in the attaching and moving step (S23) or the removal and moving step (S14) of the vane segment 11, since the auxiliary support device 50 is used when moving the vane segment 11 between the top casing 20*u* and the space below the top casing 20*u*, it is possible to reduce damage due to accidental dropping of the vane segments 11 to the minimum. Moreover, at this time, by moving the vane segment 11 along the guide rails 52 of the auxiliary support device 50, it is possible to easily perform the attachment/removal of the vane segment 11 to/from the top casing 20*u* with little effort.

In the above embodiments, in the attaching and moving step (S23) or the removal and moving step (S14) of the vane segment 11, the end section or hook of the chains of the chain blocks and one of the vanes 12 of the vane segment 11 are connected with each other via bands. However, instead of the band, a jig may be attached to one of the vanes 12 of the vane segment 11, and the end section or hook of the chain of the chain block and one of the vanes 12 of the vane segment 11 may be connected with each other via the jig.

In addition, in the above embodiments, in the attaching and moving step (S23) or the removal and moving step (S14) of the vane segment 11, the target segment is moved using a chain block; however, for example, in a case where the vane segment 11 is lightweight or the like, the chain block need not be used.

In addition, the casing of the present embodiment is split into two, the top casing 20u and the bottom casings 3d and 8d; however, the present invention may be applied to a casing split into a larger number of partial casings. In this case, out of three or more partial casings, the partial casing which covers the upper side of the rotor is selected as the target casing and the target casing is moved and disposed in a state where the split surface of the target casing faces downward.

In addition, in the above embodiments, description was given of an example of the compressor 1 provided with the vane ring 10; however, the present invention is not limited to this example, and the present invention may be applied to other rotary machines, for example, a steam turbine or the like, as long as a vane ring is provided.

INDUSTRIAL APPLICABILITY

According to one aspect of the present invention, it is possible to reduce costs relating to attaching/removing a vane ring to/from a casing.

REFERENCE NUMBER

1 Compressor
2 Compressor rotor
3 Compressor casing
3u, 7u, 8u, 20u Top casing
3d, 7d, 8d Bottom casing
4 Combustor
5 Turbine
6 Turbine rotor
7 Turbine casing
8 Compressor and turbine casing
10 Vane ring
11, 11a, 11b Vane segment (target segment)
12 Vane
18 Outer circumferential section
19o Outer circumferential surface
22 Vane ring groove
28u, 28d Split surface
40 Casing support base
50 Auxiliary support device
51 Rail
52 Guide rail
55 Roller chain
56 Roller
61 Carriage
71 First chain block
72 Second chain block
73 Third chain block
76 Chain block attaching jig

What is claimed is:

1. A method for attaching a vane ring in a rotary machine, the rotary machine being provided with:
   a rotor configured to rotate about an axis,
   a casing covering the rotor and being configured to allow the rotor to rotate, and
   a vane ring formed in an annular shape about the axis and provided on an inner circumferential side of the casing,
   the vane ring being able to split into a plurality of vane segments in a circumferential direction about the axis,
   the casing being able to split into a plurality of partial casings in the circumferential direction, and vane ring grooves being respectively formed in the partial casings, the vane ring grooves being depressed from an inside in a radial direction toward an outside in the radial direction with respect to the axis and extending in the circumferential direction, and
   the plurality of vane segments being mounted in the vane ring grooves of any of the plurality of partial casings,
   the method comprising:
   a casing disposing step of disposing a target casing, which is any one of the plurality of partial casings and is split away from another of the plurality of partial casings at a split surface, with the split surface of the target casing facing downward, at a workable position where a space is secured such that it is possible to dispose a target segment below the target casing, target segment being one of the vane segments to be attached to the target casing; and
   a segment moving step of moving the target segment, which comprises a plurality of vanes and forms an arc shape, in the circumferential direction with respect to the target casing disposed at the workable position from a state in which a center side of the arc shape of the target segment is facing upward, and mounting the target segment in the vane ring groove of the target casing.

2. The method for attaching a vane ring according to claim 1, wherein the partial casings are a top casing forming an upper side of the casing and a bottom casing forming a lower side of the casing, and the target casing is the top casing.

3. The method for attaching a vane ring according to claim 2, wherein, in the casing disposing step, the top casing is moved, while maintaining a state where the split surface of the top casing faces downward, between a casing-facing position where the top casing is disposed on the bottom casing and the workable position.

4. The method for attaching a vane ring according to claim 1, wherein, in the casing disposing step, by placing the target casing on a casing support base supporting the target casing from below, the target casing is disposed at the workable position and a state where the target casing is disposed at the workable position is maintained.

5. The method for attaching a vane ring according to claim 1, wherein, in the segment moving step, the target segment disposed or to be disposed in the space below the target casing is received using an auxiliary support device for receiving the target segment.

6. A method for attaching/removing a vane ring in a rotary machine, the rotary machine being provided with:
   a rotor configured to rotate about an axis,
   a casing covering the rotor and being configured to allow the rotor to rotate, and
   a vane ring formed in an annular shape about the axis and provided on an inner circumferential side of the casing,
   the vane ring being able to split into a plurality of vane segments in a circumferential direction about the axis,
   the casing being able to split into a plurality of partial casings in the circumferential direction, and vane ring grooves being respectively formed in the partial casings, the vane ring grooves being depressed from an inside in a radial direction toward an outside in the radial direction with respect to the axis and extending in the circumferential direction, and
   the plurality of vane segments being mounted in the vane ring grooves of any of the plurality of partial casings,
   the method comprising:
   a casing disposing step of disposing a target casing, which is any one of the plurality of partial casings and is split away from another of the plurality of partial casings at a split surface, with the split surface of the target casing facing downward, at a workable position where a space is secured such that it is possible to dispose a target segment below the target casing, the target segment being one of the vane segments attached or to be attached to the target casing; and a segment moving step of moving the target segment, which comprises a plurality of vanes and forms an arc shape, in the circumferential direction with respect to the target casing disposed at the workable position from a state in which a center side of the arc shape of the target segment is facing upward, and disposing the target segment in the space below the target casing or mounting the target segment in the vane ring groove of the target casing, wherein, in the segment moving step, the target segment disposed or to be disposed in the space below the target casing is received using an auxiliary support device for receiving the target segment, wherein the auxiliary support device has a guide rail which is opposed to an outer circumferential surface of the target segment and formed in an arc shape with a curvature corresponding to a curvature of the outer circumferential surface of the target segment and supports the target segment, and wherein, in the segment moving step, the auxiliary support device is disposed such that the vane ring groove of the target casing where the target segment is mounted or is to be mounted is on an extension of the arc of the guide rail of the auxiliary support device, and the target segment is moved along the vane ring groove of the target casing and the guide rail.

* * * * *